(12) United States Patent
Svec et al.

(10) Patent No.: US 6,876,483 B1
(45) Date of Patent: Apr. 5, 2005

(54) OPTICAL VIEWING APPARATUS

(75) Inventors: Christopher B. Svec, Palatine, IL (US); Christopher L. Kauffman, Lake Zurich, IL (US); Hao C. Tran, Gurnee, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/448,206

(22) Filed: May 30, 2003

(51) Int. Cl.[7] .................. G02B 26/00; G02B 26/08; G02B 6/42
(52) U.S. Cl. .............. 359/290; 359/298; 385/18
(58) Field of Search ................ 359/290, 291, 359/298; 385/15–18

(56) References Cited

U.S. PATENT DOCUMENTS 6,539,142 B2 * 3/2003 Lemoff et al. ............... 385/18
2002/0176151 A1 * 11/2002 Moon et al. ................ 359/298
2004/0008401 A1 * 1/2004 Szczepanek et al. ........ 359/290

* cited by examiner

*Primary Examiner*—Georgia Epps
*Assistant Examiner*—William Choi
(74) *Attorney, Agent, or Firm*—Birch, Stewart, Kolasch & Birch, LLP

(57) ABSTRACT

Apparatus which directs light rays from a distant target area scene to a plurality of wavelength detection systems without wavelength degradation. A reflective afocal telescope directs the light rays from the scene to a MEMS mirror array which redirects the rays to selected ones of the detection systems. The MEMS mirror array has individually controllable mirror elements which are driven to predetermined angular orientations to accomplish the light ray redirection. Outputs from the detection systems may be provide to a computer for analysis and/or viewing.

13 Claims, 6 Drawing Sheets

OPTICAL VIEWING APPARATUS

BACKGROUND OF THE INVENTION

1. Field of the Invention

The invention in general relates to optical systems and, more particularly, to apparatus which allows viewing of a scene simultaneously in a plurality of different wavelengths.

2. Description of Related Art

A variety of optical systems are used, both in the military and commercial fields, for viewing a distant target area so as to detect various targets of interest. Light rays from the target area may include several different wavelengths which must be detected and sensors, responsive to the different wavelengths, are provided for such detection. For this purpose beam splitters are used to direct the light rays to the different sensors.

Beam splitters include those which are spectral filters having certain coatings and substrates which reflect one wavelength band and transmit another band. Such beamsplitters, particularly when refractive optics are used, may be spectrum limited. That is, certain wavelengths may be absorbed by the optics and may not be fully detected by the sensor.

Another method of directing the light rays to the different sensors utilizes a rotating faceted mirror arrangement. Although this arrangement does not use refractive optics, it requires at least a drive motor and associated equipment, and may introduce inertial/slewing delays.

The present invention allows detection of an entire spectrum of interest with minimal optical losses and without the requirement of bulky support equipment.

SUMMARY OF THE INVENTION

Wavelength independent apparatus is described for simultaneously directing light rays, corresponding to scene information from a distant scene, to a plurality of detection systems. The apparatus includes a MEMS mirror array which has a plurality of individually controllable mirror elements having a MEMS driver connected to them to control the angular orientation of each of the mirror elements. A reflective afocal telescope is positioned to receive and direct the light rays onto the mirror elements which then simultaneously reflect the light rays into a plurality of directions as a function of the orientation of the mirror elements. Detection systems are respectively positioned to intercept the light rays reflected from the mirror elements in the plurality of different directions, and are operable to detect respectively different predetermined wavelengths in the scene information.

Further scope of applicability of the present invention will become apparent from the detailed description provided hereinafter. It should be understood, however, that the detailed description and specific example, while disclosing the preferred embodiment of the invention, is provided by way of illustration only, since various changes and modifications within the spirit and scope of the invention will become apparent to those skilled in the art, from the detailed description.

BRIEF DESCRIPTION OF THE DRAWINGS

The present invention will become more fully understood from the detailed description provided hereinafter and the accompanying drawings, which are not necessarily to scale, and are given by way of illustration only, and wherein.

DESCRIPTION OF THE PREFERRED EMBODIMENT

Figure 1:
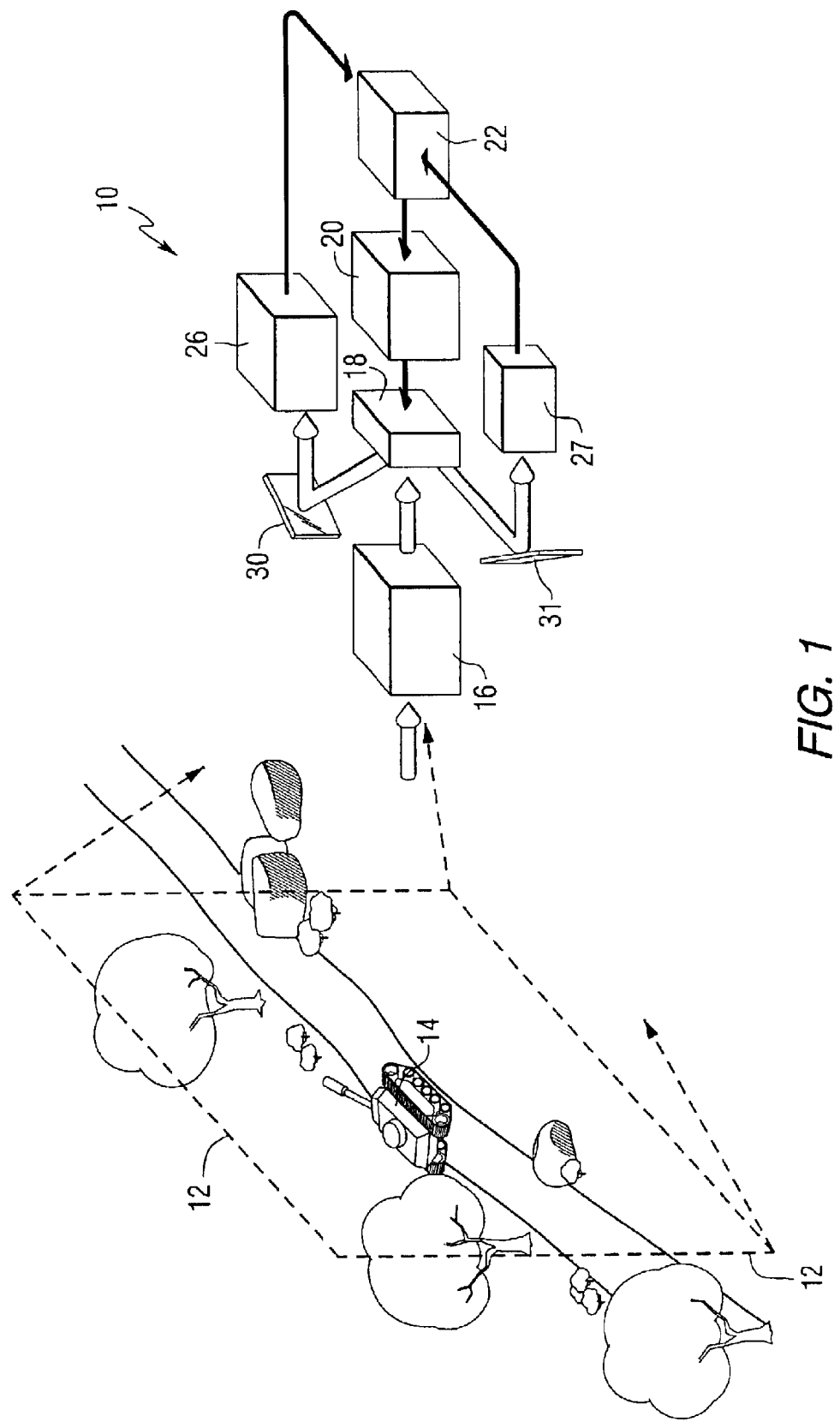
FIG. 1 is a block diagram of an embodiment of the invention for examining a distant scene.

Referring now to FIG. 1, there is depicted optical viewing apparatus 10 for viewing a distant scene 12, which may be a target area of interest, and which may include one or more targets 14. Apparatus 10 includes a reflective afocal telescope 16 which directs light rays to a MEMS (microelectromechanical system) mirror array 18, positioned behind it.

As will be described, a MEMS mirror array driver 20 is provided with signals from a central controller 22, such as a computer, and is operable to regulate the angular orientation of each MEMS mirror element in the MEMS mirror array 18.

A plurality of detection systems is provided in order to detect selected wavelengths, either a single wavelength or band of wavelengths emanating from the scene. In FIG. 1, for simplicity two such detection systems 26 and 27 are illustrated. Where space constraints are present, the apparatus 10 may include mirrors 30 and 31 for folding the optical path from the MEMS mirror array 18 to the detection systems 26 and 27.

Figure 2:
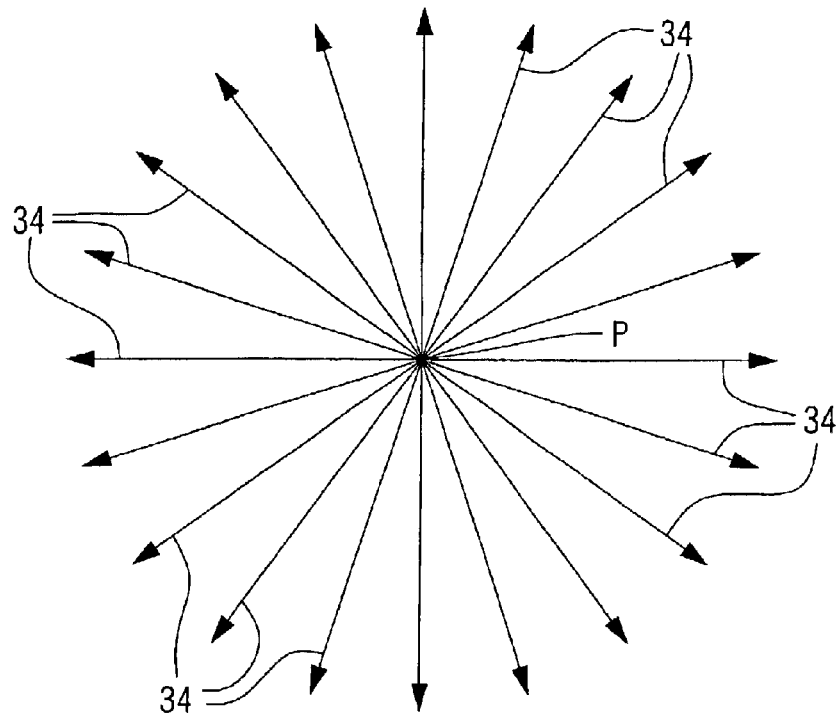
FIG. 2 illustrates a point source of light energy.

Afocal telescope 16 receives the light energy from the distant scene 12 and presents it to the MEMS mirror array 18. In FIG. 2, point P represents any point in the viewed scene. Light energy, as represented by light rays 34 radiate omnidirectionally from the point. As used herein the term "light" is meant to include not only visible light but IR (infrared) as well as UV (ultraviolet) wavelengths.

Figure 3:
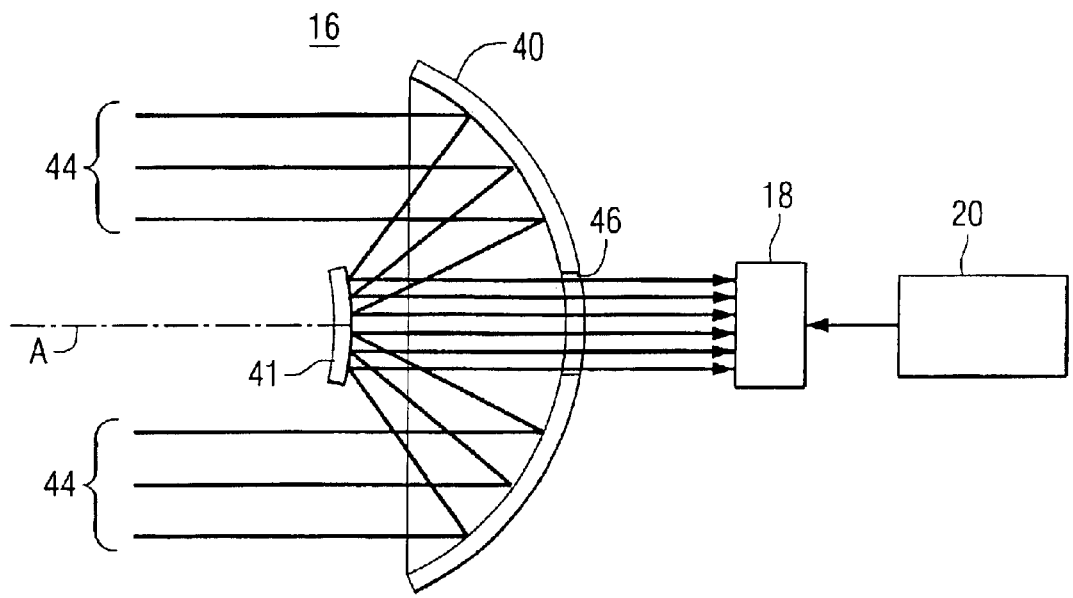
FIG. 3 is a view, partially in section, of a portion of FIG. 1.

With the scene 12 being sufficiently distant from the apparatus 10, as would be the case in actual use, it may be assumed that the light rays from each individual point in the scene arrive at the afocal telescope 16 as parallel rays. This is illustrated in FIG. 3, which also shows some details of an afocal telescope which may be utilized herein.

Afocal telescope 16 includes a primary parabolic reflector 40, as well as a secondary reflector 41, positioned along the optical axis A. Light rays 44, representing scene information from all points of the distant scene 12, reflect off of the surface of primary parabolic reflector 40, and then are directed through an aperture 46 in the rear of the primary parabolic reflector 40 by means of the secondary reflector 41. The collimated light rays passing through the aperture 46 then impinge upon the MEMS mirror array 18. It is to be noted that in the process no dielectric-coated or refractive optical elements are utilized, and accordingly, no wavelength separation occurs.

The MEMS mirror array 18 may be constituted by any one of a number of well-known MEMS mirror arrays.

Basically a typical MEMS mirror array has an N×M array of individual tiny mirror elements each adjustable to assume a certain angular orientation relative to a rest position. In its most rudimentary form, the mirror element may rotate about a single axis to a desired angular orientation as a function of a control input, either mechanical or electrical. FIGS. 5A to 5E illustrate an N×M array, where N=M, and FIGS. 4A to 4C illustrate the key to the mirror element shading.

Figure 4A:
FIGS. 4A to 4C, are keys to illustrate mirror deflection.
Figure 4B:
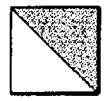
Figure 4C:
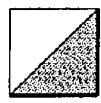

The unshaded square of FIG. 4A represents a mirror element at a rest position. The shading of FIG. 4B represents a mirror element with a particular control signal applied so as to assume a first angular orientation between 0° and +X°. The shading of FIG. 4C represents a mirror element with a particular control signal applied so as to assume a second angular orientation, such as between 0° and −X°.

Figure 5A:
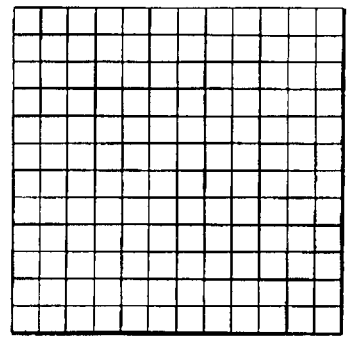
FIGS. 5A to 5E illustrate different mirror deflections of a MEMS mirror array.
Figure 5B:
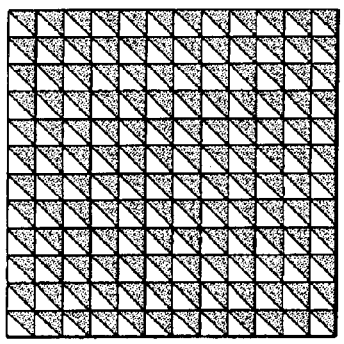
Figure 5C:
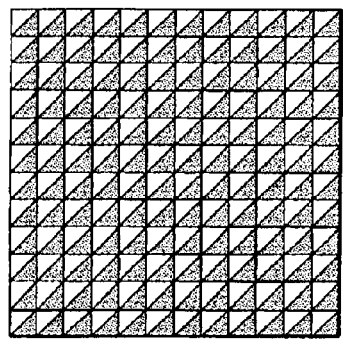

In FIG. 5A, the MEMS mirror elements of the N×M array are all at a rest position and in such case there would be no redirection of the impinging light rays from the afocal telescope 16. In FIG. 5B all of the MEMS mirror elements are collectively deflected, as in FIG. 4B, in which case all of the impinging light energy will be directed to only detection system 26. Similarly, and as illustrated in FIG. 5C, with all of the MEMS mirror elements collectively deflected, as in FIG. 4C, all of the impinging light energy will be directed to only detection system 27.

Figure 5D:
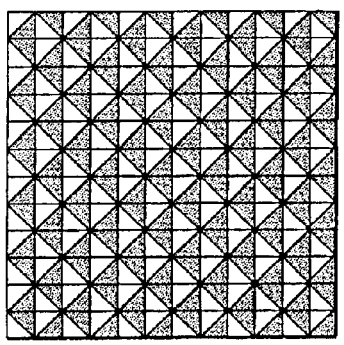

By way of example, if detection system 26 is for the detection of visible light to obtain an actual picture of the distant target area, detection system 27 may be utilized to detect targets radiating one, or a particular band of IR wavelengths. For the simultaneous detection of both visible and IR wavelengths, and as illustrated in FIG. 5D, half of the MEMS mirror elements are deflected as in FIG. 4B and the other half are, deflected as in FIG. 4C. In an alternate method, the MEMS mirror array 18 could be driven to cycle 100% intensity to each detection system for a short duration so that each detection system is subjected to full intensity part of the time.

Since there has not yet been any focusing of the light rays emanating from the distant scene, with the deflection arrangement of FIG. 5D the entire scene information is presented to detection system 26 (via mirror 30), and the entire scene information is presented to detection system 27 (via mirror 36). In this case half of the total light energy will be present at each detection system.

Figure 5E:
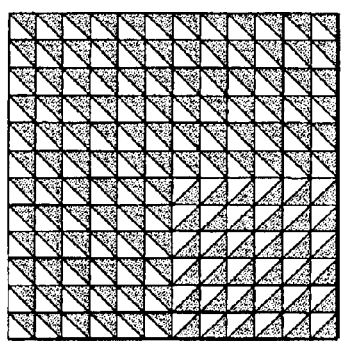

In general, with additional detection systems, the light energy presented to each system will be inversely proportional to the number of systems used. The proportion of light energy presented to each detection system may also be varied. For example, in the present case of two detection systems, and with a MEMS mirror element deflection pattern as illustrated in FIG. 5E, 75% of the light energy will be directed to detection system 26 and 25% to detection system 27.

Figure 6A:
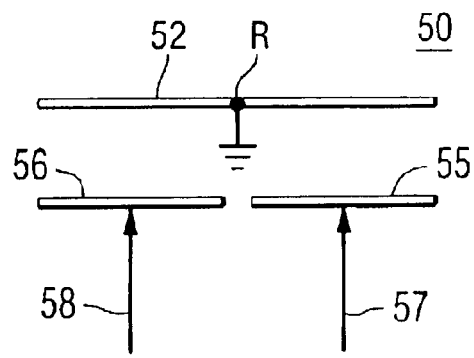
FIGS. 6A to 6C are a simplified representation of a MEMS mirror element deflection arrangement.
Figure 6B:
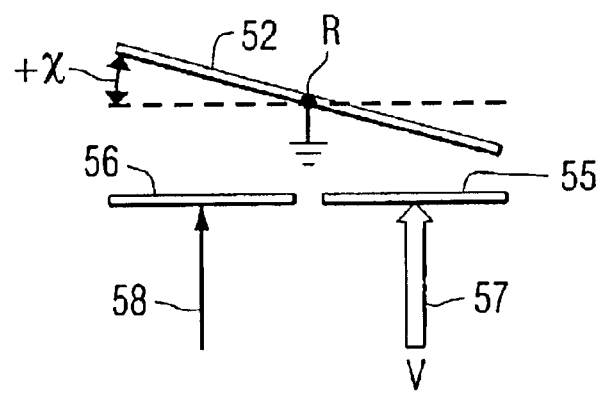
Figure 6C:
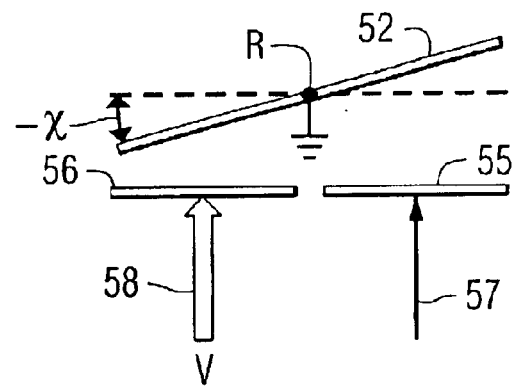

A variety of MEMS mirror arrays are available to accomplish the desired function described herein. An array, consisting of any desired number of mirror elements, is generally fabricated using integrated circuit techniques. Some arrays have elements which are rotatable around a single axis of rotation while some are fabricated to essentially rotate about two axes. FIGS. 6A to 6C illustrate, in greatly simplified form, a side view of a mirror element of an array, rotatable about a single axis R.

The MEMS mirror element 50 of FIGS. 6A to 6C includes a reflecting member 52 rotatable about axis R. The reflecting member 52 is made of metal, or has metal on the undersurface thereof, and is connected to some reference potential such as DC ground. Disposed beneath the reflecting member 52 are first and second spaced apart electrodes 55 and 56 to which are connected respective first and second leads 57 and 58. These leads 57 and 58 are selectively supplied with a control voltage from MEMS mirror driver 20 (FIG. 1).

In FIG. 6A no control voltage is applied to either electrode 55 or 56 and the reflecting member 52 is in a non-deflected position, as in FIG. 5A. If a control voltage V is applied to lead 57, as illustrated in FIG. 6B, electrostatic attraction causes the reflecting member 52 to deflect to an angle of +x, as in FIG. 5B, for example. If the control voltage V is applied to lead 58, as illustrated in FIG. 6C, the reflecting member 52 will assume an angular position of −x, as in FIG. 5C, for example.

The two angular positions of +x and −x are sufficient for apparatus with two detection systems, as illustrated in FIG. 1. For a arrangement with a greater number of detection systems, different values of control voltage can be used to deflect the reflecting member 52 to different angular orientations as a function of the control voltage.

Figure 7:
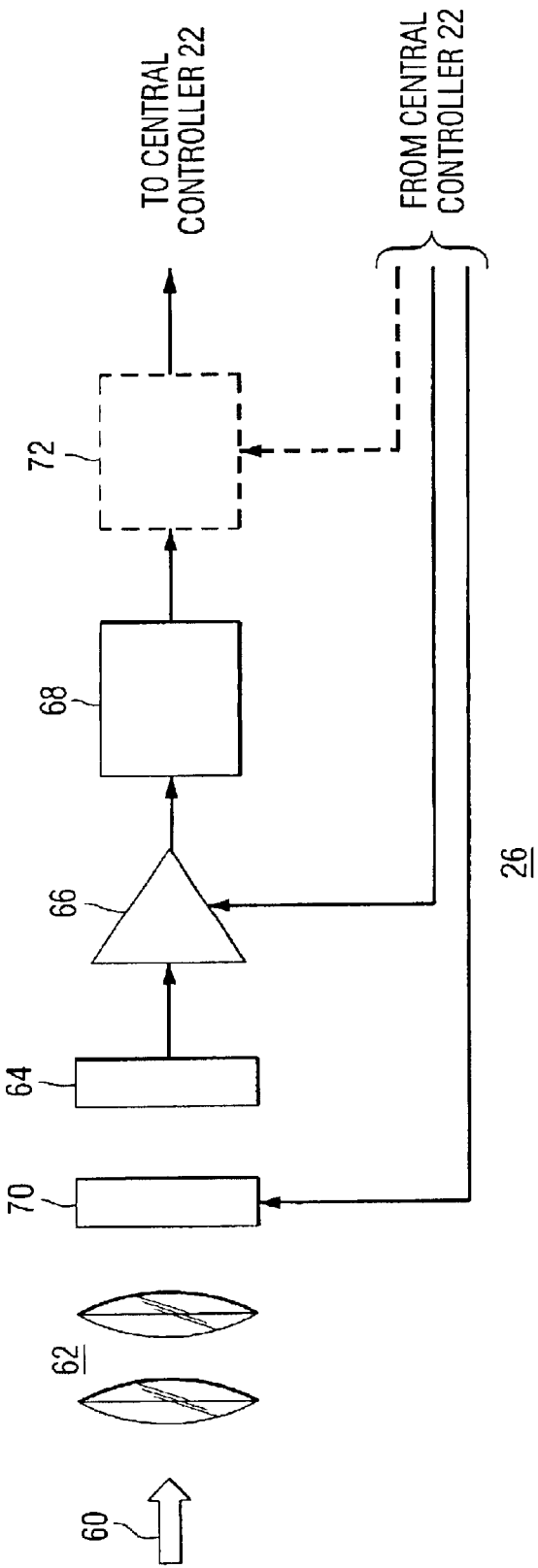
FIG. 7 is a block diagram of a typical detection system.

One type of visible light detection system such as 26 is illustrated by way of example, in FIG. 7. Arrow 60 represents the unfocused light rays reflected from MEMS mirror array 18 and mirror 30 (FIG. 1). The detection system 26 includes a section of focusing optics 62 which focuses the light rays onto a solid state detector array 64, located at the focal plane of the optics section 62. A typical solid state detector array 64 is comprised of a mosaic of tiny solid state detector elements, each responsive to impinging light energy and operable to provide a corresponding electrical output signal.

The output of the electronic detector array 64 is provided to an amplifier section 66, the output of which, after conversion to a digital format in A/D converter 68, is provided to central controller 22 for processing and analysis and/or viewing (Alternatively, the detection system 26 may have these functions built in).

As is well-known, a new image is presented to the electronic detector array 64 at a certain frame rate of, e.g. 30 Hz so that 30 complete pictures of the target area of interest will be displayed each second. During operation a "snapshot" of the target area is taken by operation of a mechanical shutter 70, as governed by central controller 22. This shutter remains open only for a fraction of the frame rate, typically 2 to 3 msec (milliseconds) as compared to 33.33 msec for the frame rate. In some systems, the function of the mechanical shutter 70 may be replaced by an electronic arrangement which would include a gating circuit such as 72, which is enabled only for the desired shutter time, to transfer the detector image information.

As previously indicated, if the light rays representing the distant scene are divided among detection systems, each detection system will receive the image at a reduced energy level, or intensity. Compensation for this reduced energy level may be accomplished with the provision of a gain control signal from central controller 22 to increase the output level of the amplifier section 66.

Figure 8:
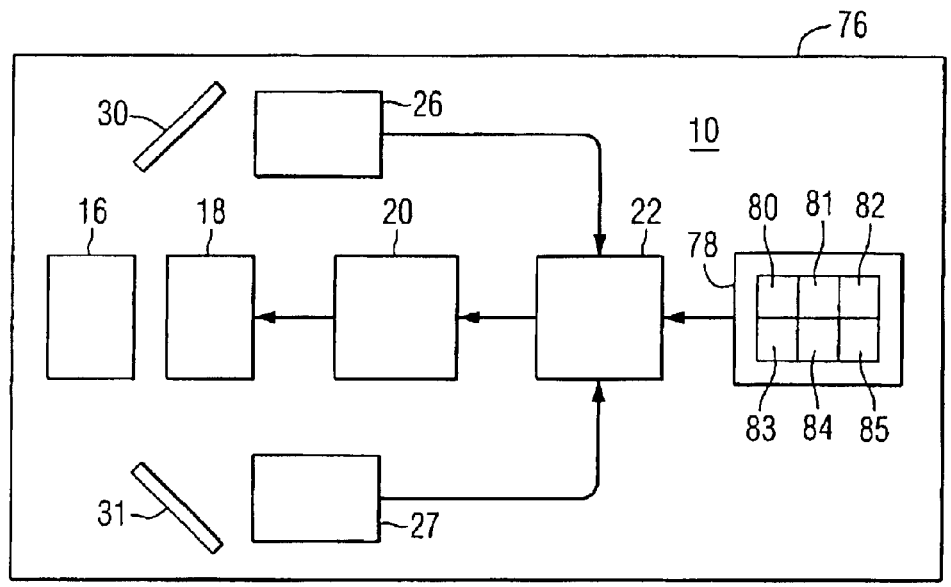
FIG. 8 is a block diagram of the apparatus with motion compensation.

Apparatus 10 may be used as a ground-based stationery monitoring station. The apparatus may also be used on a moving ground or aerial vehicle, as represented by platform 76 in FIG. 8. Coupled to platform 76 is a motion sensor system 78 which includes accelerometers 80, 81 and 82 for respectively measuring linear acceleration along mutually perpendicular axes X, Y and Z. The motion sensor system 78 additionally includes accelerometers 84, 85 and 86 for respectively measuring angular acceleration about the mutually perpendicular axes X, Y and Z. With the arrangement of FIG. 8, the present apparatus is able to perform various compensation techniques without the requirement for additional components such as mirrors and mechanical drivers.

For example, one type of compensation involves image stabilization so that the picture presented on the display remains steady even though the platform 76 and/or the detection system 26 is moving. More particularly, and with additional reference to FIG. 7, for the time period that the shutter 70 is open, the scene image is focused on the elements, or pixels, of the detector array 64 and would normally move relative to those pixels due to platform and/or detection system movement. The motion sensor system 78 generates motion indicative signals which are processed by central controller 22. The result of this processing is to instruct MEMS mirror driver 20 such that the mirror elements of MEMS mirror array 18 are slewed by a small amount to maintain the focused scene substantially immovable relative to the pixel elements, even though the scene is actually moving relative to the detection system 26.

Associated with various objects in a scene under view is a characteristic known as spatial frequency. Basically, the higher this frequency the greater will be the detail or resolution of the object. With image stabilization, discussed above, very high frequency objects in the image may be too high for the actual resolving powers of the imaging system, based upon the number, size and spacing of the pixels of the detector array 64. The photon energy of these higher frequency objects, however, get processed and corrupt the sampled image in a process known as aliasing. This may result in a display with somewhat degraded portions, however depending upon the system use requirements, this degradation may be completely acceptable, in that certain targets of interest will be clear on the display.

Figure 9:
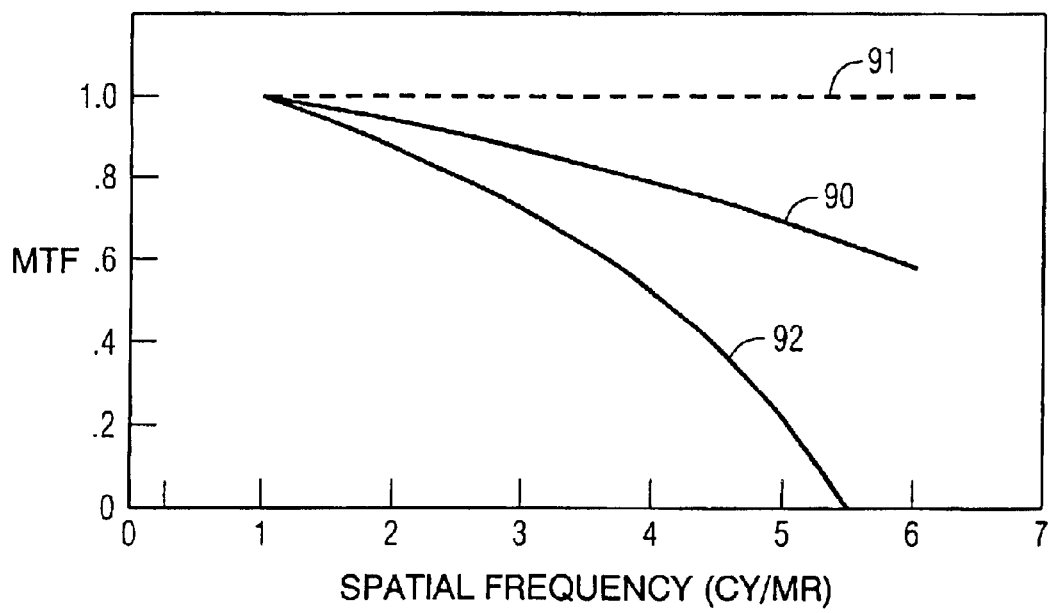
FIG. 9 is a set of characteristic curves helpful in understanding the operation of the embodiment shown in FIG. 8.

If aliasing is unacceptable, the apparatus may be operated in another mode to completely eliminate these corrupting higher frequency effects, and to this end, reference is made to FIG. 9.

FIG. 9 illustrates the Modulation Transfer Function of the apparatus for a particular image motion across the pixel elements of 2 msec between consecutive frames. Basically the Modulation Transfer Function is the characteristic response as a function of object spatial frequency, plotted, in cycles per milliradian on the horizontal axis of the Fig. Other components of the overall system, such as electronic processing components, also contribute to the Modulation Transfer Function characteristic, however for simplicity they are not shown.

In FIG. 9, curve 90 represents the uncompensated response, that is without any stabilization. Stabilization of the image across the pixel array has the effect of modifying the Modulation Transfer Function curve to assume the position of dotted curve 91, whereby all high spatial frequency components are processed.

As previously stated, the processing of all of these high spatial frequency components may cause undesired aliasing. The present apparatus, without additional components, can be operated in another mode to eliminate this aliasing effect. The resulting display will be somewhat soft and fuzzy, however for many system uses this would be acceptable.

The aliasing effect may be eliminated by very slightly moving, or smearing the image across the pixel array during the time the shutter is open. This calculated movement, governed by the output of the motion sensor system 78 and central controller 22, has the effect of modifying the Modulation Transfer Function curve to a position indicated by dot-dash curve 92. It is seen that this curve goes to a zero value such that any spatial frequencies above around 5.5 will not pass into the processing operation.

The foregoing detailed description merely illustrates the principles of the invention. It will thus be appreciated that those skilled in the art will be able to devise various arrangements which, although not explicitly described or shown herein, embody the principles of the invention and are thus within its spirit and scope. Various modes of operation, other than those described, are made possible by the present apparatus. By way of example the apparatus may be operated in a mode which may be referred to as microscanning. Basically, in such process the effective resolution of the system may be increased by increasing the frame rate of the focal plane array of pixels (for example increasing by four from 30 Hz to 120 Hz) and causing the MEMS mirror elements to slightly move the image over four different portions of the same respective pixel for consecutive samplings.

What is claimed is:

1. Wavelength independent apparatus for simultaneously directing light rays, corresponding to scene information from a distant scene, to a plurality of detection systems, comprising:
   a MEMS mirror array having a plurality of individually controllable mirror elements;
   a MEMS driver connected to said MEMS mirror array and operable to control the angular orientation of each of said mirror elements;
   a reflective afocal telescope positioned to receive and direct said light rays onto said mirror elements which then simultaneously reflect said light rays into a plurality of directions as a function of said orientation of said mirror elements;
   a plurality of detection systems respectively positioned to intercept said light rays reflected from said mirror elements in said plurality of different directions, and operable to detect respectively different predetermined wavelengths in said scene information.

2. Apparatus according to claim 1 wherein:
   said reflective afocal telescope includes a primary curved reflector having a central aperture located along an optical axis;
   said reflective afocal telescope additionally includes a secondary reflector positioned to receive light rays reflected from said primary reflector and direct them through said aperture.

3. Apparatus according to claim 2 wherein:
   said primary reflector is a parabolic reflector.

4. Apparatus according to claim 1 wherein:
   said mirror elements of said MEMS mirror array are in an N×M array.

5. Apparatus according to claim 4 wherein:
   N=M.

6. Apparatus according to claim 1 which includes:
   a plurality of reflective mirrors positioned to fold the optical path of said light rays from said MEMS mirror array to respective ones of said detection systems.

7. Apparatus according to claim 1 wherein:
   at least one of said detection systems is operable to detect visible wavelengths;
   at least another of said detection systems is operable to detect wavelengths in the IR band.

8. Apparatus according to claim 1 wherein:
   at least one of said detection systems includes an electronic detector array; and wherein the apparatus includes a control operable to increase the electronic output of said electronic detector array to compensate for diminished light energy received by said detection system.

9. Apparatus according to claim 1 wherein:

said apparatus is mounted on a moving platform;

said moving platform includes a motion sensor system providing output signals indicative of said motion; and which includes circuitry responsive to said output signals from said motion sensors and operable to adjust the angular orientation of said mirror elements to compensate for said motion.

10. Apparatus according to claim 9 wherein:

said motion sensor system includes linear accelerometers for measuring linear acceleration along three mutually perpendicular axes.

11. Apparatus according to claim 10 wherein:

said motion sensor system additionally includes angular accelerometers for measuring angular acceleration around said axes.

12. Apparatus according to claim 1 which includes:

a central controller;

said detection systems providing scene indicative information to said central controller for selective analysis and/or viewing.

13. Apparatus according to claim 12 wherein:

said central controller provides control signals to said MEMS driver indicative of desired angular orientation of said mirror elements.

* * * * *